Figure 1:
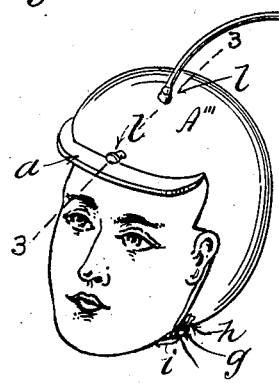

O. B. SALISBURY.
HAIR WASHING HOOD.
APPLICATION FILED AUG. 22, 1907.

998,804.

Patented July 25, 1911.
3 SHEETS—SHEET 1.

Witnesses:
J. A. Graves
Philip N. Tilden

Inventor:
Orlando B. Salisbury

O. B. SALISBURY.
HAIR WASHING HOOD.
APPLICATION FILED AUG. 22, 1907.
998,804.
Patented July 25, 1911.
3 SHEETS—SHEET 2.
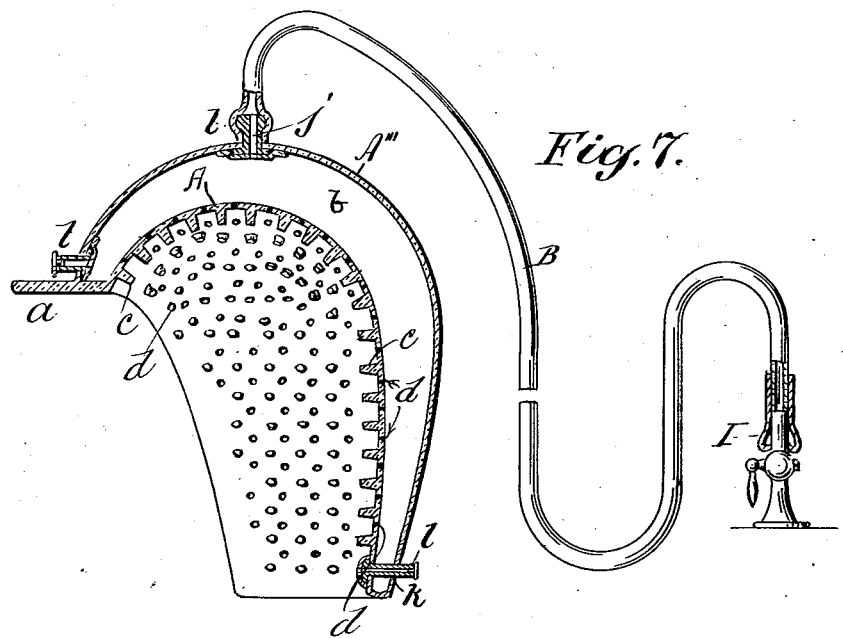
Fig. 7.
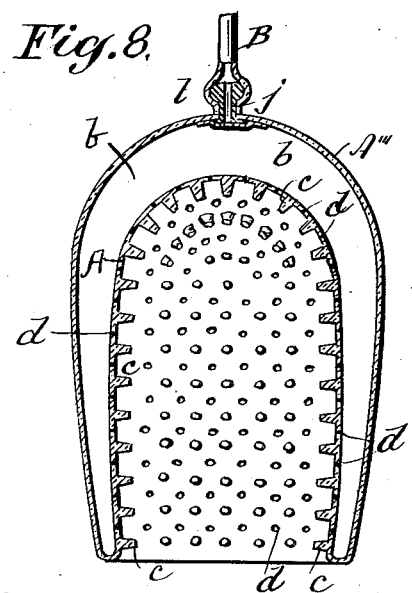
Fig. 8.
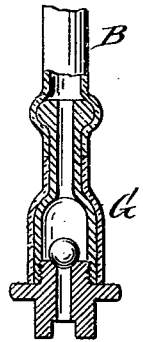
Fig. 9.
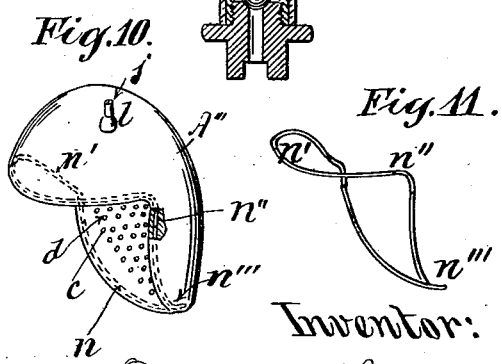
Fig. 10.
Fig. 11.
Witnesses:
Inventor:
Orlando B. Salisbury.

O. B. SALISBURY.
HAIR WASHING HOOD.
APPLICATION FILED AUG. 22, 1907.

998,804.

Patented July 25, 1911.

3 SHEETS—SHEET 3.

Witnesses:
D. W. Gardner
J. P. Storm

Inventor:
Orlando B. Salisbury

UNITED STATES PATENT OFFICE.

ORLANDO B. SALISBURY, OF NEW YORK, N. Y.

HAIR-WASHING HOOD.

998,804.

Specification of Letters Patent.   Patented July 25, 1911.

Application filed August 22, 1907. Serial No. 389,710.

*To all whom it may concern:*

Be it known that I, ORLANDO B. SALISBURY, a citizen of the United States, residing in the borough of Manhattan, the city, the county, and the State of New York, have invented a certain new and useful Improvement in Hair-Washing Hoods, of which the following is a full, clear, concise, and exact specification, accompanied with drawings and letters of reference, as will enable those skilled in the particular art to make and use the same.

My invention relates to hair-washing hoods and caps, the principal object being to cleanse all the hair, cranium, and back of the neck with soap, water and tapping from the adhering dirt, bacteria, sebum, sweat, offensive odors, epidermic scales, and comedones without pulling out said hair by the weak roots, which in time results in absolute baldness.

A further object of my invention is to wash all the hair without getting the liquid into the ears and obstructing the hearing.

A still further object of my invention is to cleanse the hair without letting the liquid run down the body.

Another object of the invention is to squeeze a part of the liquid off from the cranium before drying by pressure and tapping.

Still another object of my invention is to alter the temperature, circulation, respiration, and secretions of the cranial skin by the application of warm or cold water.

Other advantages of the invention are that it may be easily applied to the cranium by the brims, securely fastened at the neck for the employment of both hands, quickly rinsed, and readily hung up.

To accomplish these objects my invention consist essentially of a flexible water-proof cranial and neck portion extending to the lower margin of the hair and in back of the ears; an inclosed long hair portion continuous with said cranial or neck portion; a flexible outer wall secured to said cranial, neck or long hair portion; a plurality of flexible integral projecting fingers on the inside of said cranial, neck, and long hair portion; a triangular forehead division in the center of said cranial portion; strap-fasteners secured near the sides of said triangular division and neck portion; straps drawn through said fasteners and secured in front of the forehead and beneath the chin of the wearer; an inlet aperture at the top of said outer wall; an outlet aperture at the lower end of said outer wall; disk-faced couplings fitted to said apertures; screw-couplings connected to said disk-based couplings; an inlet tube connected to said upper screw-coupling; means for supplying water to said inlet tube; an outlet tube connected to said lower screw-coupling; and a shut-off clamp on said outlet tube as hereinafter specified.

Figure 2:
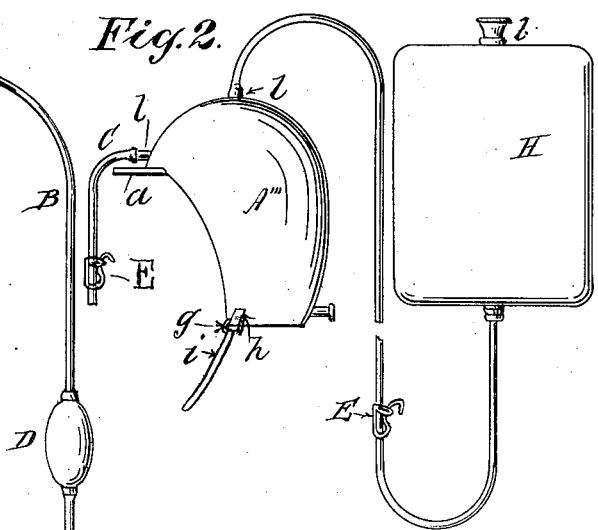
Figure 3:
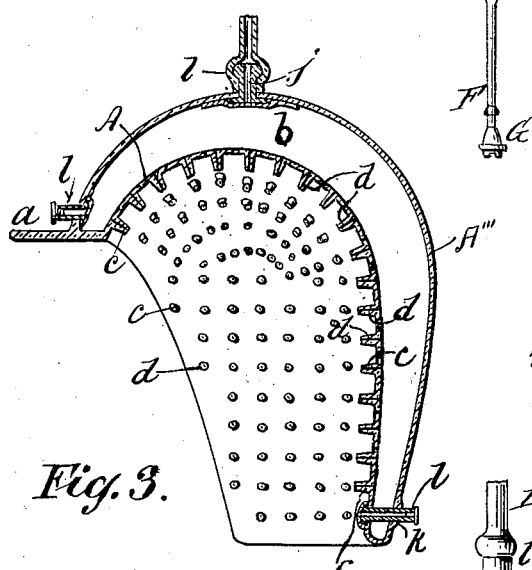
Figure 4:
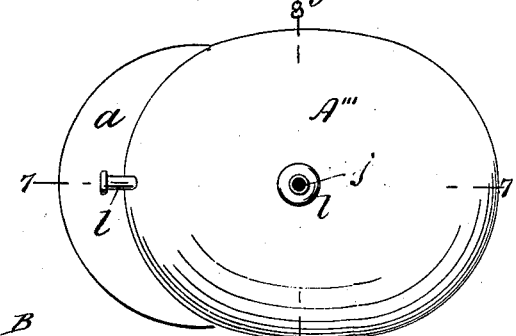
Figures 5, 6:
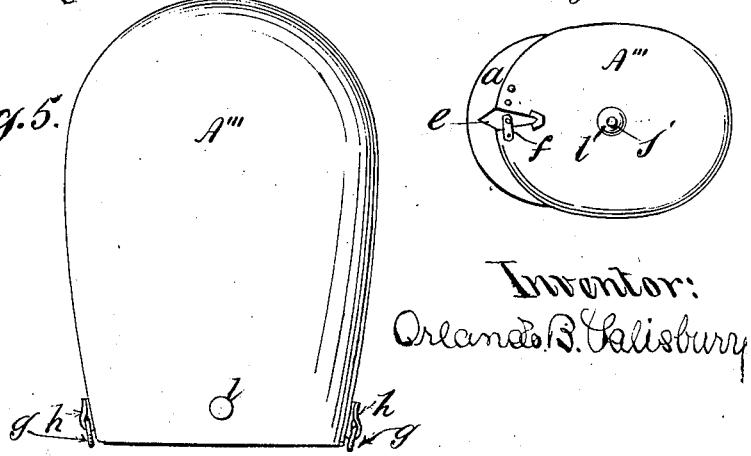
Figure 12:
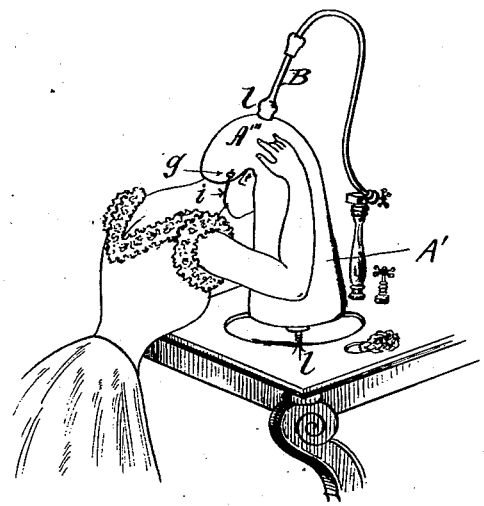
Figure 13:
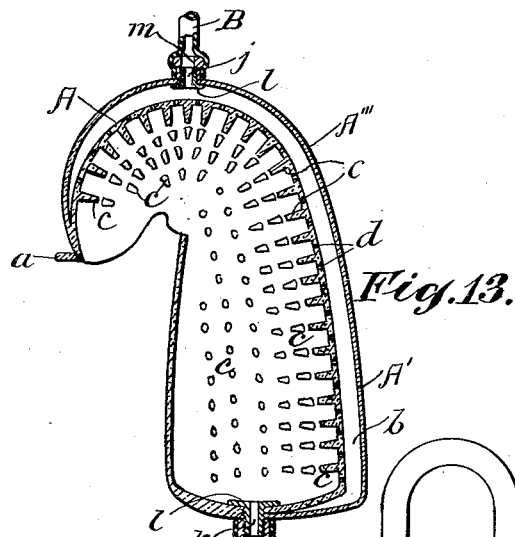
Figure 14:
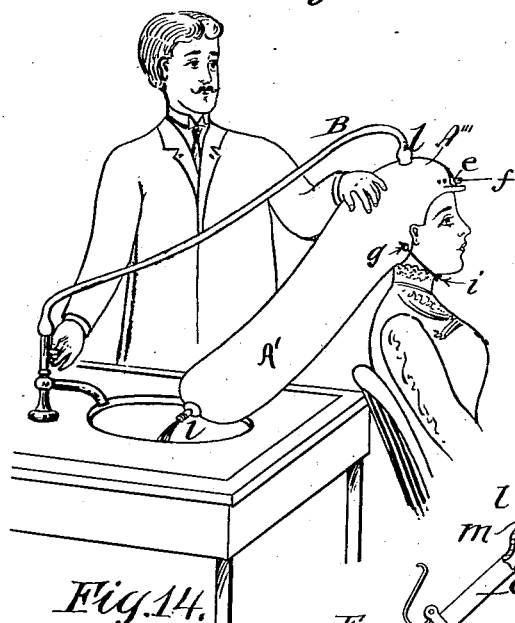
Figure 15:
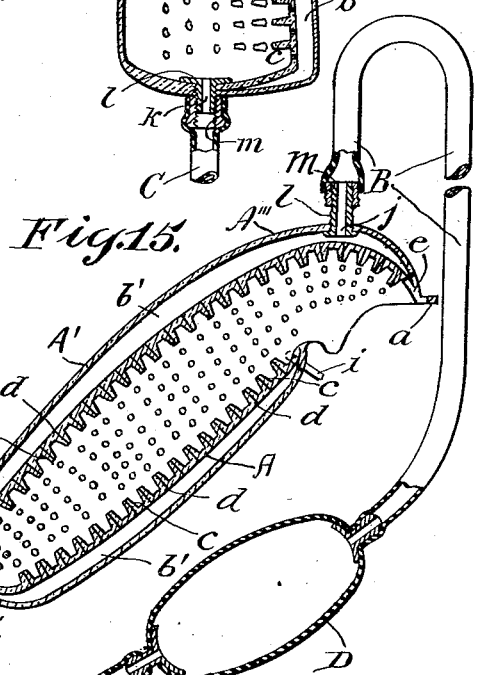

In the drawings, Figure 1 is a perspective view of my hair-washing hood showing the cranial and neck portion on the head connected to the tubes, bulb, and detachable valve-end; Fig. 2 is a side elevation of the hood connected to the tubes and detachable bag; Fig. 3 is a vertical section on line 3—3 of Fig. 1, showing the outer wall, projecting fingers on inside of the cranial and neck portion, perforations through said cranial and neck portion and fingers, and disk-based couplings; Fig. 4 is a top view showing the front brim and inlet aperture; Fig. 5 is a back view showing the rings secured by straps and outlet aperture; Fig. 6 is a top view showing the triangular forehead division and rings secured by straps; Fig. 7 is a vertical section of a modified form on line 7—7 of Fig. 4; Fig. 8 is a transverse section on line 8—8 of Fig. 4; Fig. 9 is a section of the detachable valve-end; Fig. 10 is a perspective view og a modified form of Fig. 6 showing the springs inclosed in the reënforced rim; Fig. 11 is a perspective view of the forehead, temples, and neck springs; Fig. 12 is a perspective view of a modified form of Fig. 7; Fig. 13 is vertical section of the same; Fig. 14 is perspective view of another modified form of Fig. 1; and Fig. 15 is a vertical section of the same, similar letters referring to similar parts throughout the drawings.

My device is constructed of a waterproof cranial neck portion A heavily reinforced at the rim, preferably of flexible rubber, extending to the lower margin of the hair and in back of the ears as shown in Fig. 1. Continuous with the front of the cranial portion is a flexible brim *a* for pulling the hood over the head or for removing the same. On the cranial and neck portion is a flexible outer wall A''', preferably of rubber, united in the usual manner at the rim as illustrated in Fig. 2. Between the outer wall and cranial and neck portion is a reservoir $b$ for holding soap or liquid. On the inside of the cranial and neck portion are a plurality of flexible integral projecting fingers $c$ rounded at the points, preferably of rubber to wash the skin between the hair. Passing through the cranial and neck portion and fingers are a plurality of small perforations $d$ to more easily and thoroughly distribute the liquid over the hair and skin and cleanse the same. Near the lower sides of the neck portion are secured suitable strap fasteners, preferably rings $g$ secured by short straps $h$. Through these fasteners are drawn straps $i$ and secured beneath the chin of the wearer to draw the rim water-tight and keep the hood on the cranium and neck in a stooping, sitting, or straight position. At the top and lower end of the outer wall is a large inlet $j$ and outlet $k$ aperture for the passage of the liquid. Into the apertures are fitted disk-based couplings $l$. At the top of the wall is an inlet tube B connected to the disk-based coupling. In the middle of the inlet tube is a flexible bulb D connected as usually for forcing the liquid to the head. To the outer end of the inlet tube is connected an inlet coupling F. On the outer end of the inlet coupling or inlet tube are suitable means for supplying water, preferably a detachable valve-end G for controlling the flow of liquid as indicated in Figs. 1 and 9; or a detachable bag H for holding a liquid as illustrated in Fig. 2. At the lower end of the outer wall is an outlet tube C connected to the disk-based coupling as shown in Fig. 2. Lastly, on the outlet tube is a shut-off clamp E for controlling the flow of liquid.

In Figs 7 and 8 I have shown the perforations $d$ through the cranial and neck portion between the projecting fingers $c$ so the liquid may flow while said fingers are in contact with the skin.

In Fig. 12 I have illustrated a long hair portion $A'$ continuous with the cranial portion adapted for a stooping position; while in Fig. 13 I have shown the outer wall of the same, projecting fingers on the inside of said long hair portion, perforations through the long hair portion between said fingers, and a screw-cap $o$ at the lower disk-based coupling.

In Fig. 14 I have illustrated a long hair portion continuous with the neck portion adapted for a sitting position and a triangular forehead division or split $e$ reinforced at the sides as best indicated in Fig. 6 for adjusting the rim to different sizes of heads with a strap $i$; while in Fig. 15 I have shown the outer wall of the same; projecting fingers on the inside of the long hair portion, perforations through the long hair portion and fingers; triangular forehead division, screw-couplings secured to the disk-based couplings, and inlet and outlet tubes connected to said screw coupling.

In Fig. 10 I have illustrated the springs inclosed in the reinforced rim of the cranial and neck portion to fit in the hollows and assist in drawing the rim water-tight; while in Fig. 11 I have shown the forehead $n'$, temples $n''$ and neck $n'''$ springs of the same.

There are many methods of using my hair-washer. One way is to grasp the brims $a$ and carefully pull the hood over the cranium, back of the neck, and hair, allowing the air to escape by the rim or shut-off clamp E. After securing the straps $i$ and $f$ stoop in front of a basin, then immerse the detachable valve-end G in soap-suds and alternately compress and relax the bulb D until partly full, allowing the long hair portion $A'$ to rest on the back of the person, edge of the basin, back of the chair, or adjustable tripod. Next gently tap the cranial, neck, or long hair portion with the hands for a moment, then open the shut-off clamp or stretch the rim to allow the wash-water to escape, repeating the operation if necessary. Now detach the valve-end from the inlet tube B, then attach the faucet coupling G or bag H and allow the water to run tapping all the time. When thoroughly rinsed, press the water off from the hair and skin, then dry by pressure and tapping.

Another way of using this invention before washing is to remove the screw-couplings $m$ from the disk-based couplings $i$ of the cranial and long hair portion to insert the soap in the reservoir $b$, then pull down the hair and replace the screw-couplings. Lastly, another way of using my invention before washing is to place the soap and water in the hood or on the hair.

Having described my invention, what I claim as new and wish to secure by Letters Patent, is:

1. A hair-washing hood consisting of a water-proof cranial and neck portion extending to the lower margin of the hair and in back of the ears, a flexible outer wall secured to the rim of said cranial and neck portion provided with an inlet aperture at the top, a reservoir between said cranial and neck portion and outer wall, a plurality of perforations passing through said cranial and neck portion, and an inlet tube connected to said aperture, substantially as shown and described.

2. A hair-washing hood consisting of a water-proof cranial and neck portion extending to the lower margin of the hair and in back of the ears, a flexible outer wall secured to the rim of said cranial and neck portion provided with an inlet aperture at the top, a plurality of flexible integral projecting fingers on the inside of said cranial and neck portion, a reservoir between said cranial and neck portion and outer wall, a plurality of perforations passing through said cranial and neck portion, and an inlet tube connected to said aperture, substantially as shown and described.

3. A hair-washing hood consisting of a water-proof cranial and neck portion extending to the lower margin of the hair and in back of the ears, a flexible outer wall secured to the rim of said cranial and neck portion provided with an inlet aperture at the top, a plurality of flexible integral projecting fingers on the inside of said cranial and neck portion, a reservoir between said cranial and neck portion and outer wall, a plurality of perforations passing through said cranial and neck portion and fingers, and an inlet tube connected to said aperture, substantially as shown and described.

4. A hair-washing hood consisting of a water-proof cranial and neck portion extending to the lower margin of the hair and in back of the ears, a flexible outer wall secured to the rim of said cranial and neck portion provided with an inlet aperture at the top, a plurality of flexible integral projecting fingers on the inside of said cranial and neck portion, a reservoir between said cranial and neck portion and outer wall, a plurality of perforations passing through said cranial and neck portion and fingers, straps fastened to the lower sides of the neck portion and at the ends beneath the chin of the wearer, and an inlet tube connected to said aperture, substantially as shown and described.

5. A hair-washing hood consisting of a water-proof cranial and neck portion extending to the lower margin of the hair and in back of the ears, a flexible outer wall secured to the rim of said cranial and neck portion provided with an inlet aperture at the top, a plurality of flexible integral projecting fingers on the inside of said cranial and neck portion, a reservoir between said cranial and neck portion and outer wall, a plurality of perforations passing through said cranial and neck portion and fingers, means for adjusting and drawing the rim water-tight, straps fastened near the lower sides of said neck portion and at the ends beneath the chin of the wearer, a disk-based coupling fitted to said aperture, and an inlet tube connected to said aperture, substantially as shown and described.

6. A hair-washing hood consisting of a water-proof cranial and neck portion extending to the lower margin of the hair and in back of the ears, a flexible outer wall secured to the rim of said cranial and neck portion, provided with an inlet aperture at the top, a plurality of flexible integral projecting fingers on the inside of said cranial and neck portion, a reservoir between said cranial and neck portion and outer wall, a plurality of perforations passing through said cranial and neck portion and fingers, a triangular forehead division in front of said cranial portion, straps fastened near the lower sides of said triangular division and neck portion and at the ends in front of the forehead and beneath the chin of the wearer, and an inlet tube connected to said aperture, substantially as shown and described.

7. A hair-washing hood consisting of a water-proof cranial and neck portion extending to the lower margin of the hair and in back of the ears, a flexible outer wall secured to the rim of said cranial and neck portion provided with an inlet and outlet aperture, a plurality of flexible integral projecting fingers on the inside of said cranial and neck portion, a reservoir between said cranial and neck portion and outer wall, a plurality of perforations passing through said cranial and neck portion and fingers, a triangular forehead division in front of said cranial portion, straps fastened near lower sides of said triangular division and neck portion and at the ends in front of the forehead and beneath the chin of the wearer, an inlet tube connected to said upper aperture, an outlet tube connected to said lower aperture, and a shut-off clamp on said outlet tube substantially as shown and described.

8. A hair-washing hood consisting of a water-proof cranial and neck portion extending to the lower margin of the hair and in back of the ears, a flexible outer wall secured to the rim of said cranial and neck portion, provided with an inlet and outlet aperture, a plurality of flexible integral projecting fingers on the inside of said cranial and neck portion, a reservoir between said cranial and neck portion and outer wall, a plurality of perforations passing through said cranial and neck portion and fingers, a triangular forehead division in front of said cranial portion, straps fastened near the lower sides of said triangular division and neck portion and at the ends in front of the forehead and beneath the chin of the wearer, an inlet tube connected to said upper aperture, means for supplying water to said inlet tube; an outlet tube connected to said lower aperture, and a shut-off clamp on said outlet tube, substantially as shown and described.

9. A hair-washing hood consisting of a water-proof cranial and neck portion extending to the lower margin of the hair and in back of the ears; an inclosed long hair portion continuous with said cranial or neck portion provided with an inlet and outlet aperture, a flexible outer wall secured to said cranial, neck, and long hair portion; a plurality of flexible integral projecting fingers on the inside of said cranial and neck portion; a reservoir between said cranial, neck, and long hair portion and wall; a plurality of perforations passing through said cranial, neck, and long hair portion and fingers; a triangular forehead division in front of said cranial portion; straps fastened near the lower sides of said triangular division and neck portion and at the ends in front of the forehead and beneath the chin of the wearer; an inlet tube connected to said upper aperture; means for supplying water to said inlet tube; an outlet tube connected to said lower aperture; and a shut-off clamp on said outlet tube, substantially as shown and described.

10. A hair-washing hood consisting of a water-proof cranial and neck portion extending to the lower margin of the hair and in back of the ears; an inclosed long hair portion continuous with said cranial or neck portion provided with an inlet and outlet aperture; a flexible outer wall secured to said cranial, neck, and long hair portion; a plurality of flexible integral projecting fingers on the inside of said cranial, neck, and long hair portion, a reservoir between said cranial, neck, and long hair portion and outer wall; a plurality of perforations passing through said cranial, neck, and long hair portion and fingers; a triangular forehead division in front of said cranial portion; straps fastened near the lower sides of said triangular division and neck portion and at the ends in front of the forehead and beneath the chin of the wearer; an inlet tube connected to said upper aperture; means for supplying water to said inlet tube; an outlet tube connected to said lower aperture; and a shut-off clamp on said outlet tube, substantially as shown and described.

11. A hair-washing hood consisting of a water-proof cranial and neck portion extending to the lower margin of the hair and in back of the ears; an inclosed long hair portion continuous with said cranial or neck portion provided with an inlet and outlet aperture; a flexible outer wall secured to said cranial, neck, and long hair portion; a plurality of flexible integral projecting fingers on the inside of said cranial, neck, and long hair portion; a reservoir between said cranial, neck, and long hair portion and outer wall; a plurality of perforations passing through said cranial, neck, and long hair portion and fingers; a triangular forehead division in front of said cranial portion; straps fastened near the lower sides of said triangular division and neck portion and at the ends in front of the forehead and beneath the chin of the wearer; disk-based couplings fitted to said apertures; screw-couplings connected to said disk-based couplings an inlet tube connected to said upper screw couplings; means for supplying water to said inlet tube; an outlet tube connected to said lower screw-coupling; and a shut-off clamp on said outlet tube, substantially as shown and described.

12. A hair-washing hood consisting of a water-proof cranial and neck portion extending to the lower margin of the hair and in back of the ears; an inclosed long hair portion continuous with said cranial or neck portion provided with an inlet and outlet aperture; a flexible outer wall secured to said cranial, neck, and long hair portion; a plurality of flexible integral projecting fingers on the inside of said cranial, neck, and long hair portion; a reservoir between said cranial, neck, and long hair portion and outer wall; a plurality of perforations passing through said cranial, neck, and long hair portion and fingers; a triangular forehead division in front of said cranial portion; straps fastened near the lower sides of said triangular division and neck portion and at the ends in front of the forehead and beneath the chin of the wearer; disk-based couplings fitted to said apertures; screw-couplings connected to said disk-based couplings; an inlet tube connected to said upper screw coupling; a flexible bulb connected in the middle of said inlet tube; an inlet coupling connected to the outer end of said inlet tube; a valve-end detachable from said inlet coupling; an outlet tube connected to said lower screw-coupling; and a shut-off clamp on said outlet tube, substantially as shown and described.

In testimony whereof I affix my signature, this 21st day of August 1907, in the presence of two subscribing witnesses.

ORLANDO B. SALISBURY.

Witnesses:
D. W. GARDNER,
ISAAC P. STORM.